United States Patent [19]
Haga

[11] Patent Number: 6,159,410
[45] Date of Patent: Dec. 12, 2000

[54] GYPSUM-BASED COMPOSITE ARTICLE AND METHOD FOR PRODUCING SAME

[75] Inventor: Tadashi Haga, Tokyo, Japan

[73] Assignee: Yoshino Sangyo Co., Ltd., Japan

[21] Appl. No.: 09/491,634

[22] Filed: Jan. 26, 2000

Related U.S. Application Data

[62] Division of application No. 08/966,929, Nov. 10, 1997.

[30] Foreign Application Priority Data

| Nov. 12, 1996 | [JP] | Japan | 8-299159 |
| May 16, 1997 | [JP] | Japan | 9-126125 |
| Aug. 6, 1997 | [JP] | Japan | 9-211476 |

[51] Int. Cl.$^7$ .................................................... B28B 1/16
[52] U.S. Cl. .................. 264/256; 264/130; 264/136; 264/219; 264/251; 264/255; 264/257; 264/333
[58] Field of Search ..................... 264/219, 241, 264/251, 256, 257, 333, 130, 136, 137; 156/42, 45, 60; 428/703

[56] References Cited

U.S. PATENT DOCUMENTS

| 3,944,688 | 3/1976 | Dierks et al. | 428/219 |
| 3,974,024 | 8/1976 | Yano et al. | 162/101 |
| 4,187,275 | 2/1980 | Bracalielly et al. | 264/511 |
| 4,242,406 | 12/1980 | El Bouhnini et al. | 428/236 |
| 4,810,569 | 3/1989 | Lehnert et al. | 428/285 |
| 5,202,174 | 4/1993 | Capaul | 428/138 |
| 5,342,680 | 8/1994 | Randall | 428/285 |
| 5,395,685 | 3/1995 | Seth et al. | 428/283 |
| 5,401,588 | 3/1995 | Garvey et al. | 428/703 |
| 5,552,187 | 9/1996 | Green et al. | 427/389.8 |
| 5,791,109 | 8/1998 | Lehnert et al. | 52/309.17 |

*Primary Examiner*—Timothy Speer
*Assistant Examiner*—Stephen Stein
*Attorney, Agent, or Firm*—Bachman & LaPointe, P.C.

[57] ABSTRACT

The invention relates to a first gypsum-based composite article reinforced with glass fibers. This first article has a first member made of a hard gypsum, a second member made of a soft gypsum, and a mat made of the glass fibers. The mat is embedded in the article in a manner that the first and second members are bonded together by means of the mat. This first article is superior in resistance to external force acting thereon and to severe environmental conditions, even if the gypsumbased article is light in weight and thin in thickness. The invention further relates to a second gypsum-based composite article having a base plate, a glass fiber mat bonded to the base plate, and a gypsum layer formed on the glass fiber mat such that glass fibers of the glass fiber mat are embedded in the gypsum layer. This second article also has superior characteristics as those of the first article. The invention still further relates a third gypsum-based composite article having a first gypsum layer made of a first gypsum, a second gypsum layer made of a second gypsum, and a third layer made of electromagnetic wave shielding fibers. The third layer is interposed between and bonded to the first and second gypsum layers and is made in the form of a mesh. This third article also has superior characteristics as those of the first article, in addition to electromagnetic wave shielding capability.

4 Claims, 5 Drawing Sheets

GYPSUM-BASED COMPOSITE ARTICLE AND METHOD FOR PRODUCING SAME

This is a Division of application Ser. No. 08/966,929, filed Nov. 10, 1997.

BACKGROUND OF THE INVENTION

The present invention relates to gypsum-based composite articles which are usable as fireproof architectural materials, and methods for producing such articles.

Hitherto, cement (portland cement) board or gypsum board made of hard gypsum has generally been used as a fireproof and earthquake-proof architectural material. Gypsum board is advantageously less than portland cement board in weight, if both boards have the same dimensions. Furthermore, gypsum board becomes advantageously more flexible, as it becomes thinner in thickness. A mineral of gypsum contains a main component of calcium sulfate and is smell-less, colorless and atoxic. Gypsum products are chiefly used in the building industry and as a retarder in portland cement. Limited amounts of gypsum products are used as the mold material for producing ceramic products and in the field of medicine, particularly dentistry. In general, gypsum is obtained by purifying the natural gypsum mineral. In recent years, however, gypsum has mainly been obtained as a by-product in a process for producing phosphoric acid by decomposing rock phosphate with sulfuric acid. This gypsum is called chemical gypsum, particularly phosphogypsum.

There are two types of gypsum, that is, dihydrate gypsum ($CaSO_4.2H_2O$) and anhydrous gypsum ($CaSO_4$), and most of the natural and chemical gypsum belongs to dihydrate gypsum. In industrial use of gypsum, dihydrate gypsum is ground and then calcined at high temperatures to remove part of the water of crystallization. The obtained calcined product, hemihydrate gypsum ($CaSO_4.1/2H_2O$), is generally known as plaster of paris. When the powdered hemihydrate gypsum is mixed with water to form a paste or slurry, the calcining reaction is reversed. With this, the paste or slurry sets and hardens to a hard, coherent, stable solid made of dihydrate gypsum, with expansion and heat generation. According to Japanese Industrial Standard (JIS), the above-mentioned calcined gypsum (plaster of paris) is classified into four grades, that is, Special high grade, A-grade, B-grade and C-grade. The amount of water to be mixed with calcined gypsum must be specifically changed, depending on the grade of calcined gypsum. In this regard, a calcined gypsum with higher grade requires less amount of water in the preparation of the slurry, and the set plaster prepared from such calcined gypsum having higher grade becomes superior in strength and durability. The set plaster (gypsum product) varies in strength, density, expansion coefficient and porosity, depending on the type of additives and the mixing time for mixing calcined gypsum with water, as well as the amount of water to be mixed therewith. Thus, it is required in the preparation of gypsum products to carefully select the optimum materials and the optimum conditions.

Hitherto, there have been known reinforced gypsum products each having therein a reinforcing material of paper or Manila hemp. This reinforcing material is embedded in the gypsum product and serves as a binding or joining material to improve the strength of the gypsum product. These reinforced gypsum products, however, are generally insufficient in fireproofness and in resistance to external force (e.g. earthquake) acting thereon and to severe environmental conditions (e.g. abrupt change of the ambient temperature).

Architectural wood or plywood boards are generally used as floor material, wall material and trim members of building interior. These boards, however, are not sufficient in sound insulation and fireproofness.

SUMMARY OF THE INVENTION

It is an object of a first aspect of the present invention to provide a gypsum-based composite article reinforced with glass fibers, which is superior in resistance to external force acting thereon and to severe environmental conditions, even if the article is light in weight and thin in thickness.

It is an object of a second aspect of the present invention to provide a gypsum-based composite article reinforced with glass fibers, which is fireproof, earthquake-proof and sound insulating, even if the article is light in weight and thin in thickness.

It is an object of a third aspect of the present invention to provide a gypsum-based composite article which is superior in electromagnetic wave shielding.

According to a first aspect of the present invention, there is provided a gypsum-based composite article reinforced with glass fibers. This article comprises a first member made of a hard gypsum, a second member made of a soft gypsum, and a mat made of the glass fibers. The soft gypsum has a compressive strength which is lower than that of the hard gypsum. The mat is embedded in the article in a manner that the first and second members are bonded together by means of the mat.

According to the first aspect of the present invention, there is provided a method for producing the above gypsumbased composite article. This method comprises the sequential steps of:

(a) preparing a substrate having a first shape;

(b) applying a mold releasing agent to an outer surface of the substrate, thereby to form a mold releasing film on the outer surface of the substrate;

(c) applying a first mass of a first slurry which is a mixture of water and a hard gypsum plaster, to the mold releasing film, thereby to form a first layer on the mold releasing film, the hard gypsum plaster being hardenable into a hard gypsum;

(d) disposing on the first layer the mat impregnated with a second mass of the first slurry;

(e) deaerating the mat disposed on the first layer;

(f) applying a second slurry, which is a mixture of water and a soft gypsum plaster, to the mat, the soft gypsum plaster being hardenable into a soft gypsum having a compressive hardness lower than that of the hard gypsum, such that a second layer is formed on the mat and thus that a precursor of the gypsum-based article is formed on the substrate, the precursor being a laminate of the first layer, the mat and the second layer;

(g) curing the precursor to produce the gypsum-based composite article having a second shape conforming to the first shape of the substrate; and (h) removing the substrate from the gypsum-based composite article.

According to a second aspect of the present invention, there is provided another gypsum-based composite article comprising a base plate, a glass fiber mat bonded to the base plate, and a gypsum layer formed on the glass fiber mat such that glass fibers of the glass fiber mat are embedded in the gypsum layer.

According to the third aspect of the present invention, there is provided still another gypsum-based composite article comprising a first gypsum layer made of a first gypsum, a second gypsum layer made of a second gypsum, and a third layer made of electromagnetic wave shielding fibers. The third layer is interposed between and bonded to the first and second gypsum layers and is made in the form of a mesh.

DESCRIPTION OF THE PREFERRED EMBODIMENTS

A gypsum-based composite article reinforced with glass fibers, according to the first aspect of the present invention, will be described in detail, as follows.

Figure 1:
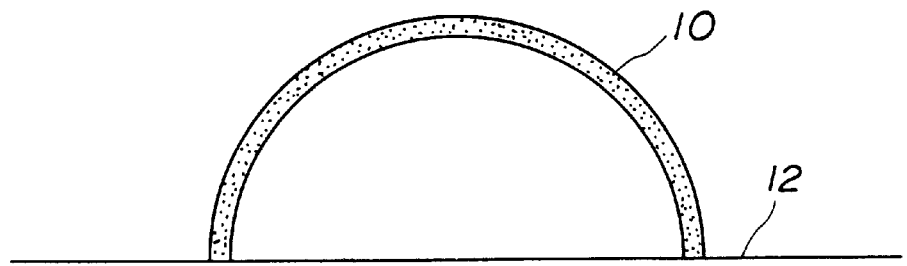
FIGS. 1 to 7 are elevational sectional views showing sequential steps for producing a gypsum-based composite article reinforced with glass fibers, according to the first aspect of the present invention.
Figure 2:
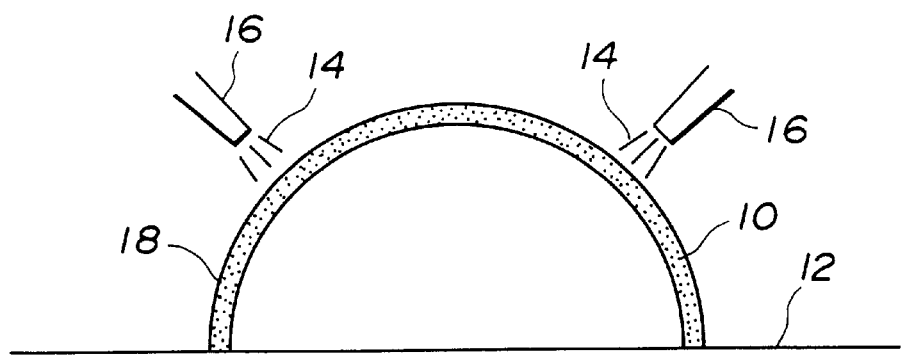
Figure 3:
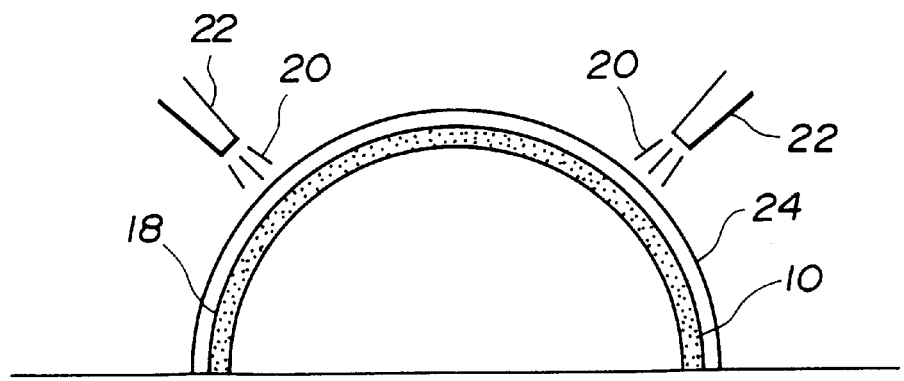
Figure 4:
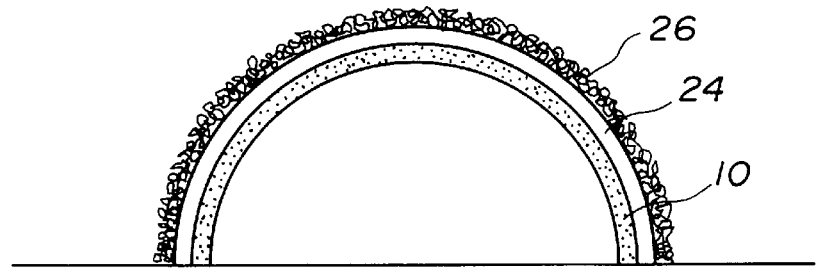
Figure 5:
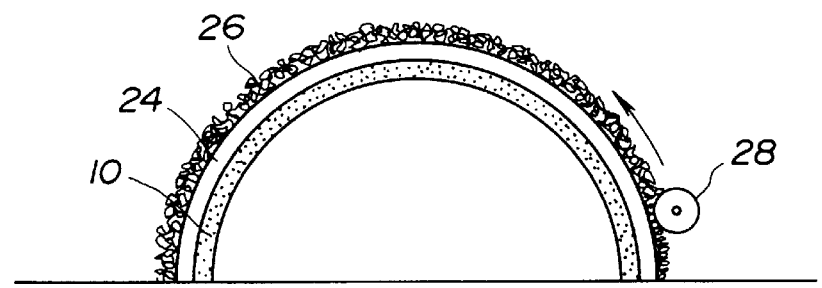
Figure 6:
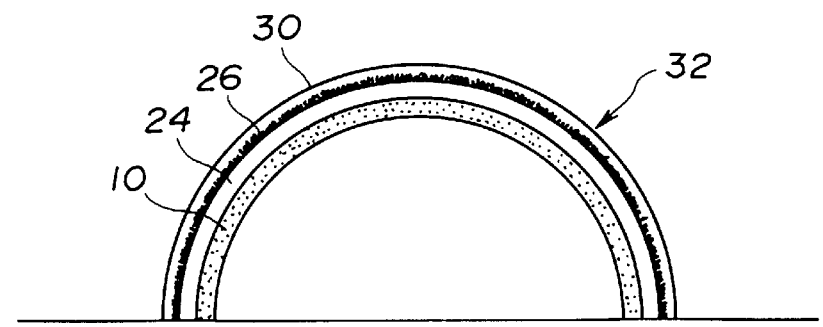
Figure 7:
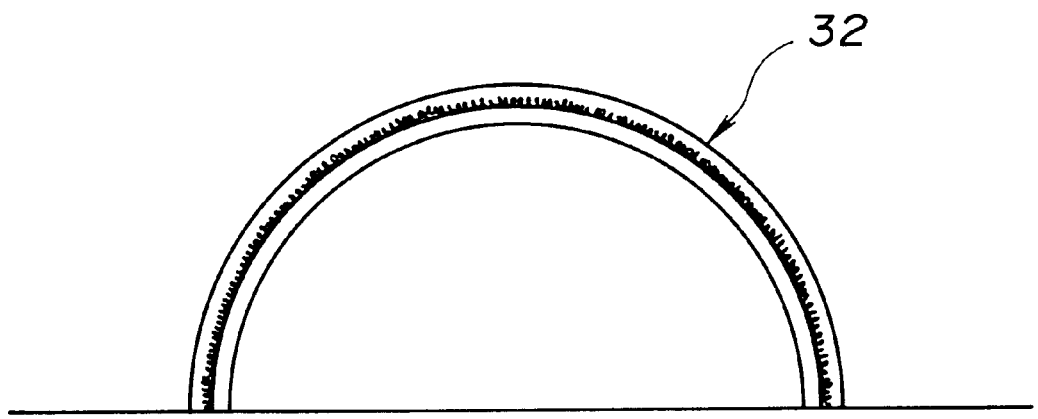

As stated above, the gypsum-based composite article has a first member made of a hard gypsum, a second member made of a soft gypsum, and a mat made of the glass fibers. The soft gypsum has a compressive strength which is lower than that of the hard gypsum. The mat is made of glass fibers and embedded in the article in a manner that the first and second members are bonded together by means of the mat. For example, this glass fiber mat may be disposed between the first and second members, as shown in FIG. 7. Furthermore, it is preferable to make many of the glass fibers penetrate into the first and second members. With this, the first and second member are firmly joined together. The gypsum-based composite article becomes superior in resistance to external force (e.g., earthquake) acting thereon and to severe environmental conditions (e.g., abrupt change of ambient temperature).

In contrast to the first aspect of the present invention, if an article is made of only a hard gypsum, the article becomes superior in hardness. This article, however, becomes insufficient in flexibility. Thus, this article may have cracks upon receiving a strong external force. Furthermore, if an article is made of only a soft gypsum, the article becomes superior in flexibility. This article, however, becomes insufficient in bending strength and compressive strength. In contrast to these articles, according to the first aspect of the present invention, the hard gypsum improves the article in compressive strength, the soft gypsum cushions the article from external force, and the glass fiber mat firmly joints the first and second members together. In order to fulfill these functions, it is preferable to dispose the gypsum-based composite article, which is used, for example, as a building interior material, in a manner to expose the first member to the building interior. In this case, the second member is concealed and serves as a backing member of the first member. Such gypsum-based composite article of the present invention becomes superior in fireproofness and earthquake-proofness.

In the invention, it is preferable that the hard gypsum has a compressive strength of from 240 to 700 $kgf/cm^2$, more preferably of about 450 $kgf/cm^2$, and that the soft gypsum has a compressive strength of from 90 to 170 $kgf/cm^2$, more preferably of about 140 $kgf/cm^2$. Furthermore, a standard amount of water to be mixed with the hard gypsum plaster, which is hardenable to the hard gypsum, is preferably from about 40 to about 43 wt %, more preferably about 43 wt %, based on the total weight of the hard gypsum plaster. It is preferable that the hard gypsum has a wet tensile strength of from 20 to 35 $kg/cm^2$, more preferably of about 30 $kg/cm^2$, and an expansion coefficient of from about 0.24 to about 0.30%, more preferably of about 0.27%. A standard amount of water to be mixed with the soft gypsum plaster, which is hardenable to the soft gypsum, is preferably from about 70 to about 76 wt %, more preferably about 74 wt %, based on the total weight of the soft gypsum plaster. It is preferable that the soft gypsum has a wet tensile strength of from 10 to 18 $kg/cm^2$, more preferably of about 14 $kg/cm^2$, and an expansion coefficient of from about 0.13 to about 0.17%, more preferably of about 0.15%.

In the invention, it is preferable to prepare the glass fiber mat by laying together continuous strands of glass fibers made of an alkali-free glass, in all directions, using a binding agent, such that the glass fiber mat has a substantially uniform thickness. In other words, the glass fibers are in random directions and not oriented in a certain particular direction. It is preferable that each of the glass fibers has a fiber diameter of from about 3 to about 18 $\mu$m, more preferably of about 3 $\mu$m, and a tensile strength of from about 240 to about 400 $kg/mm^2$, more preferably of about 350 $kg/mm^2$. An exemplary commercial product of the glass fiber mat is Unifilo U-816 300×127 (trade name) of Vetrotex Co. This commercial product is made of an E glass, which is an electrical-insulating alkali-free borosilicate glass. Due to the use of such electrical-insulating glass, dust does not easily adhere to the surface of the gypsum-based composite article of the present invention. Thus, it becomes possible to keep its surface clean for a long time. The glass fibers are preferably made of continuous fibers. Thus, the gypsum-based composite article, having such continuous glass fibers embedded therein, becomes superior in tensile strength and bending strength, as compared with a conventional gypsum-based composite article reinforced with, for example, Manila hemp chips.

The above-mentioned gypsum-based composite article reinforced with glass fibers, according to the first aspect of the present invention, was prepared by the following exemplary method. This method comprises the above-stated sequential steps of (a) to (h), as shown in FIGS. 1–7. In this method, at first, as is seen from FIG. 1, a hemispherical substrate 10 was formed on a base surface 12, in the step (a).

This substrate 10 was used for producing a gypsum-based composite article intended to be used as a dome ceiling. Then, as is seen from FIG. 2, a mold releasing agent (gel) 14 was applied in the step (b) to the outer surface of the substrate 10, using a spray gun 16, thereby to form a mold releasing thin film 18 having a smooth surface, on the outer surface of the substrate 10. Then, as is seen from FIG. 3, a first mass of a first slurry 20 which was a mixture of a hard gypsum plaster and 43 wt % of water, based on the total weight of the hard gypsum plaster, was applied in the step (c) to the mold releasing thin film 18, using a spray gun 22, thereby to form a first layer 24 of the first slurry, having a certain desired thickness, on the mold releasing film 18. A hard gypsum prepared by hardening the hard gypsum plaster had a wet tensile strength of 30 kg/cm$^2$, a compressive strength of 450 kgf/cm$^2$ and an expansion coefficient of 0.27%. Then, as is seen from FIG. 4, while the first mass of the first slurry 20 was in a semidry condition, a glass fiber mat 26, that is, a commercial product called Unifilo U-816 300×127 (trade name) of Vetrotex Co., which had previously been immersed in a second mass of the first slurry 20, was put on the whole surface of the first layer 24, in the step (d). In other words, the glass fiber mat 26 used in the step (d) was impregnated with the second mass of the first slurry 20. Glass fibers of the glass fiber mat 26 had a tensile strength of 350 kg/mm$^2$ and a fiber diameter of 3 $\mu$m. Then, as is seen from FIG. 5, the glass fiber mat 26 was deaerated in the step (e) by rolling a roller 28 on the glass fiber mat 24, with the addition of a certain load to the roller 28 With this, air was removed from the glass fiber mat 26, and thus the glass fiber mat 26 was tightly disposed on the first layer 24. Then, as is seen from FIG. 6, a second slurry, which was a mixture of a soft gypsum plaster and 74 wt % of water, based on the total weight of the soft gypsum plaster, was applied in the step (f) to the glass fiber mat 26, using a spray gun. With this, a second layer 30 of the second slurry was formed on the glass fiber mat 26, and thus a precursor of the gypsum-based composite article was formed on the substrate 10. A soft gypsum prepared by hardening the soft gypsum plaster had a wet tensile strength of 14 kg/cm$^2$, a compressive strength of 140 kgf/cm$^2$, and an expansion coefficient of 0.15%. After the step (f), the precursor was cured in the step (g) to produce the gypsum-based composite article having a second shape conforming to the first shape of the substrate 10. The curing time may be about 4 hr in the summer and from about 5 to about 6 hr in the winter. After the step (g), the substrate 10 was removed in the step (h) from the gypsum-based composite article 32 (see FIG. 6). Then, as is seen from FIG. 7, the gypsum-based article 32 alone was dried for about 24 hr, to complete it used as a dome ceiling. The gypsum-based composite articles according to the first aspect of the present invention prepared by the above-mentioned exemplary method had a specific gravity of from 1.3 to 1.7, an average thickness of 7 mm, a minimum thickness of 4 mm, a weight per unit area thereof in the form of flat plate of 10.5 kg/m$^2$, a bending strength of at least 80 kgf/cm$^2$, and a water content of up to 1.0%. It should be noted that the gypsum-based composite article according to the first aspect of the present invention is superior in fireproofness and strength, even if it has a thickness of less than 7 mm. In the above-mentioned exemplary method, an aqueous solution containing about 0.5% of a setting retarder was added into each of the first and second masses of the first slurry and the second slurry, in order to retard the hardening of the first and second slurries. In addition to the setting retarder, it is optional to add a polymer or antifoaming agent thereinto.

A gypsum-based composite article according to the second aspect of the present invention will be described in detail in the following. As stated above, this gypsum-based composite article comprises a base plate, a glass fiber mat bonded to the base plate, and a gypsum layer formed on the glass fiber mat such that glass fibers of the glass fiber mat are embedded in the gypsum layer. Gypsum, which is used in the gypsum layer, is superior in compressive strength, and glass fibers, which are used in the glass fiber mat, are superior in tensile strength. Thus, the gypsum-based composite article becomes superior in fireproofness, earthquake-proofness and sound insulation.

Figure 8:
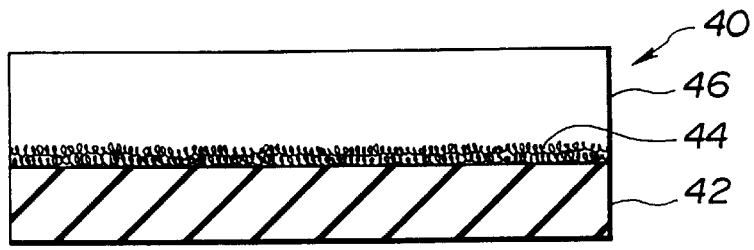
FIGS. 8–11 are sectional views showing gypsum-based composite articles according to the second aspect of the present invention, having base plates that are respectively, as shown in FIGS. 8–11, a hard rubber plate, a synthetic resin plate, a laminate of two wood plates and a hard rubber plate interposed therebetween, and a laminate of a wood plate, a synthetic resin plate and a hard rubber plate interposed therebetween.
Figure 9:
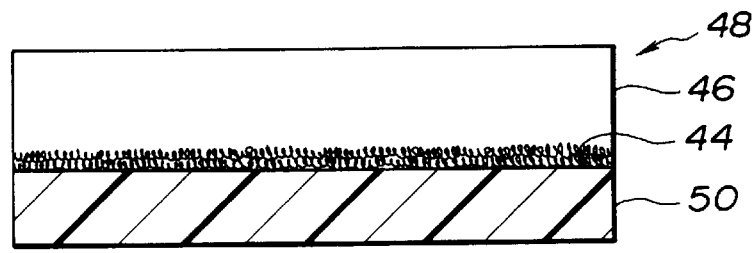
Figure 10:
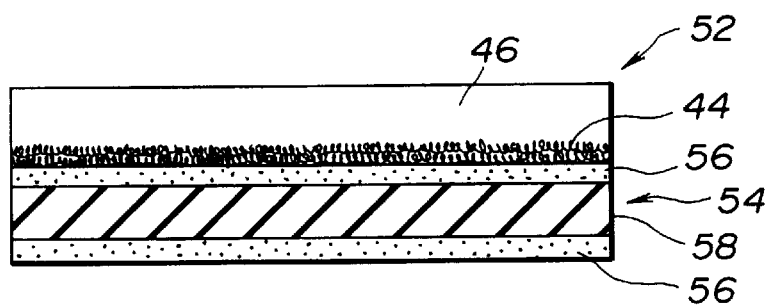
Figure 11:
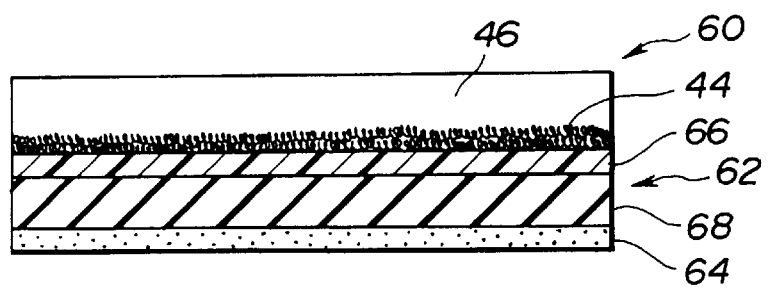

As is seen from FIG. 8, according to the second aspect of the present invention, a first exemplary gypsum-based composite article 40 comprises a base plate 42 made of hard rubber, a glass fiber mat 44, and a gypsum layer 46 made of hard gypsum. This article 40 is superior in sound insulation and earthquake-proofness, and thus preferably used as floor, wall and ceiling materials of hall and the like. As is seen from FIG. 9, according to the second aspect of the present invention, there is provided a second exemplary gypsum-based composite article 48 which is the same as that of the first article 40, except in that the base plate 42 is replaced with a base plate 50 made of synthetic resin (e.g. urethane or styrene foam). The second article 48 having the base plate 50 made of styrene foam becomes particularly superior in sound insulation. As is seen from FIG. 10, according to the second aspect of the present invention, there is provided a third exemplary gypsum-based composite article 52 which is the same as that of the first article 40, except in that the base plate 42 is replaced with a base plate 54 which is a laminate of first and second wood plates 56, 56 and a hard rubber plate 58 which is interposed therebetween and bonded thereto by means of adhesive. The base plate 54 is relatively light in weight and relatively low in price. Therefore, the third article 52 is preferably used as wall and ceiling materials of houses and the like. As is seen from FIG. 11, according to the second aspect of the present invention, there is provided a fourth exemplary gypsum-based composite article 60 which is the same as that of the first article 40, except in that the base plate 42 is replaced with a base plate 62 which is a laminate of a wood plate 64, a synthetic resin plate 66 made of, for example, urethane, and a hard rubber plate 68 which is interposed therebetween and bonded thereto by means of adhesive. Due to the use of this base plate 62, the fourth article 60 is preferably used as floor, wall and ceiling materials of hall or operating room in hospital, which requires good sound insulation.

The above-mentioned first to fourth exemplary articles 40, 48, 52, 60 according to the second aspect of the present invention may be prepared by the following first exemplary method. In this method, at first, the glass fiber mat 44 is bonded to the whole surface of the base plate 42, 50, 54 or 62, using an adhesive. This glass fiber mat 44 may be the above-mentioned commercial product, Unifilo U-816 300× 127 (trade name) of Vetrotex Co. Then, a roller is rolled on the glass fiber mat 44 in order to assuredly bonding the glass fiber mat 44 with the base plate. Then, a mixture (slurry) of a hard gypsum plaster and 43 wt % of water, based on the total weight of the hard gypsum plaster, is applied to the glass fiber mat 44, using, for example, a spray gun. With this, the glass fiber mat 44 is impregnated with the slurry. In the preparation of this mixture, it is optional to use a hard gypsum plaster which is hardenable to hard gypsum having a wet tensile strength of 30 kg/cm$^2$, a compressive strength of 450 kgf/cm$^2$ and an expansion coefficient of 0.27%. Then, curing is conducted to harden the hard gypsum plaster into the hard gypsum. With this, there is prepared the gypsum-based composite article in which glass fibers of the glass fiber mat 44 are embedded in the gypsum layer 46. The curing time may be about 4 hr in the summer and about 5 to about 6 hr in the winter.

Furthermore, the first to fourth exemplary architectural articles 40, 48, 52 and 60 according to the second aspect of the present invention may be prepared by the following second exemplary method which is a slight modification of the above-mentioned first method. That is, after bonding the glass fiber mat 44 to the base plate, a first mixture (slurry) which is the same as that of the first method is applied to the glass fiber mat 44, using, for example, a spray gun, in a manner that the glass fiber mat 44 becomes partly impregnated with the first slurry. Then, while the first slurry is in a semidry condition, a second mixture (slurry) of a soft gypsum plaster and 74 wt % of water, based on the total weight of the soft gypsum plaster, is applied to the glass fiber mat 44, using, for example, a spray gun, in a manner that the rest (non-impregnated portion) of the glass fiber mat 44 becomes fully impregnated with the second slurry. Thus, the glass fiber mat is embedded in the hard and soft gypsum layers. In the preparation of the second slurry, it is optional to use a soft gypsum plaster which is hardenable to a soft gypsum having a wet tensile strength of 14 kg/cm$^2$, a compressive strength of 140 kgf/cm$^2$, and an expansion coefficient of 0.15%. The gypsum-based composite article prepared by the second method is cushioned from external force by the provision of the soft gypsum layer.

A gypsum-based composite article according to the third aspect of the present invention, which has the electromagnetic wave shielding capability, will be described in detail, as follows. As is seen from FIG. 12, there is provided a first exemplary gypsum-based composite article 70 comprising a first gypsum layer 72 made of a first gypsum, a second gypsum layer 74 made of a second gypsum, and a third layer 76 which is made of electromagnetic wave shielding fibers and in the form of a mesh. The first and second gypsum layers 72, 74 and the third layer 76 are bonded together to produce the article 70 in the form of integral body. It is preferable that the first gypsum is a hard gypsum having a compressive strength of from 240 to 700 kgf/cm$^2$ and that the second gypsum is a soft gypsum having a compressive strength of from 90 to 170 kgf/cm$^2$. The electromagnetic wave shielding fibers of the third layer are preferably made of electrical-insulating glass fibers coated with an electromagnetic wave shielding material. These electrical-insulating glass fibers may be made of an E-glass which is an electrical-insulating alkali-free borosilicate glass. The electromagnetic wave shielding fibers may be prepared by electrodepositing the electromagnetic wave shielding material (e.g. Ni, Cu, Pb, Zn and mixtures thereof) onto the electrical-insulating glass fibers.

Figure 12:
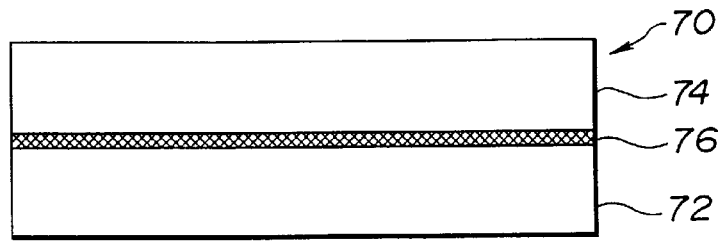
FIG. 12 is a sectional view showing a gypsum-based composite article according to the third aspect of the present invention, having first and second gypsum layers and a third layer which is interposed therebetween and made of electromagnetic wave shielding fibers.

The gypsum-based composite article 70 according to the third aspect of the present invention shown in FIG. 12 may be prepared by the following first exemplary method. In the first method, at first, the third layer 76 is bonded to the first gypsum layer 72 by means of adhesive. Then, a slurry of water and a soft gypsum plaster is applied to the third layer 76, using, for example, a spray gun, in a manner to fully impregnate the third layer 76 with the slurry by rolling a roller on the third layer 76. This soft gypsum plaster is hardenable into the soft gypsum. Thus, the second gypsum layer 74 is formed on the third layer 76. Then, the second gypsum layer 74 is cured, to produce the article 70. The curing time may be about 4 hr in the summer and about 5 to about 6 hr in the winter.

The gypsum-based composite article 70 according to the third aspect of the present invention shown in FIG. 12 may also be prepared by the following second exemplary method. In the second method, at first, a first mass of a slurry of water and a soft gypsum plaster is applied to the total surface of the first gypsum layer 72, thereby to form a thin layer of this slurry on the first gypsum layer 72. Then, while this thin layer (not shown in FIG. 12) is in a semidry condition, the third layer 76, which has previously been immersed in a second mass of the above slurry, is put on the thin layer. Then, a roller is rolled on the third layer 76 with a certain constant load thereto, to closely dispose the third layer 76 on the thin layer. Then, a third mass of the above slurry is applied to the third layer 76, using a spray gun, thereby to form thereon a precursor of the second layer 74. Then, this precursor is cured for a certain desired period of time, to form the second layer 74 on the third layer 76.

Figure 13:
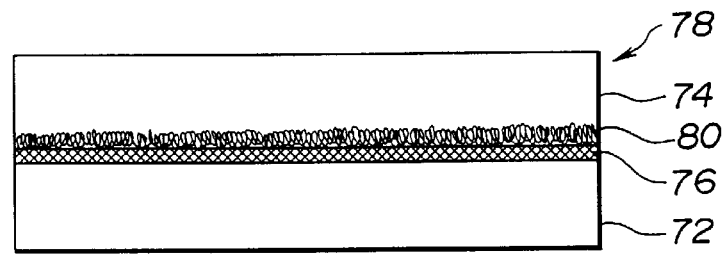
FIG. 13 is a view similar to FIG. 12, but showing a laminate of the third layer and a glass fiber mat, which laminate is interposed between the first and second gypsum layers.
Figure 14:
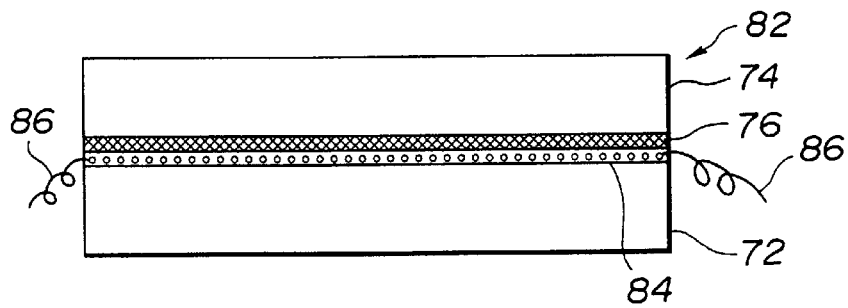
FIG. 14 is a view similar to FIG. 12, but showing a laminate of the third layer and a heating layer, which laminate is interposed between the first and second gypsum layers.

As is seen from FIG. 13, there is provided a second exemplary gypsum-based composite article 78 according to the third aspect of the present invention, which is identical with the article 70 of FIG. 12, except in that a glass fiber mat 80 is additionally provided, as illustrated. This glass fiber mat 80 is interposed between and bonded to the second gypsum layer 74 and the third layer 76. As this glass fiber mat 80, there can be used the above-mentioned commercial product, Unifilo U-816 300×127 (trade name) of Vetrotex Co. The obtained article 78 becomes light in weight and superior in electromagnetic wave shielding, fireproofness, earthquake proofness and sound insulation. As is seen from FIG. 14, there is provided a third exemplary gypsum-based composite article 82 according to the third aspect of the present invention, which is identical with the article 70 of FIG. 12, except in that a heating layer 84 having heating wires is additionally provided, as illustrated. This heating layer 84 is interposed between and bonded to the first gypsum layer 72 and the third layer 76. The heating layer 84 is a part of an electric heater for generating heat from the heating layer 84. In FIG. 14, designated by numerals of 86 are electrical terminals of the heater, which are connected to the heating wires. The heating layer 84 is fixed to the third layer 76, preferably using a mesh tape. With this, it becomes possible to maintain a constant heating effect from the heating layer 84 for a long time. Thus, the obtained article 82 has electromagnetic shielding and heating capabilities.

Figure 15:
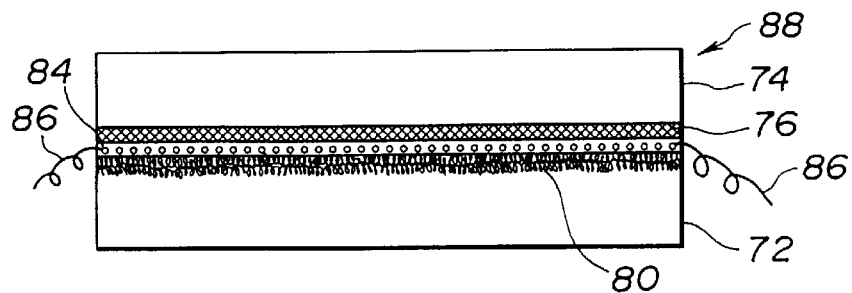
FIG. 15 is a view similar to FIG. 12, but showing a laminate of the third layer, the heating layer and the glass fiber mat, which laminate is interposed between the first and second gypsum layers.

As is seen from FIG. 15, there is provided a fourth exemplary gypsum-based composite article 88 which is identical with the article 82 of FIG. 14, except in that the glass fiber mat 80 of FIG. 13 is additionally provided, as illustrated. In fact, the glass fiber mat 80 is interposed between and bonded to the first gypsum layer 72 and the heating layer 84. The obtained article 88 becomes light in weight and superior in electromagnetic wave shielding, heating capability, fireproofness, earthquake proofness and sound insulation.

The above-mentioned second to fourth exemplary gypsum-based composite articles 78, 82, 88 of the third aspect of the present invention may be prepared by methods similar to the above-mentioned first and second methods for producing the first exemplary gypsum-based composite article 70 thereof. Although these first to fourth exemplary gypsum-based composite articles are shown in the form of flat board in FIGS. 12–15, these articles may also be produced in a form having three dimensional curves as shown in FIG. 7, using a substrate.

In the invention, it is optional to add 1–3 wt % of a silver-free inorganic antibacterial to the slurry of the hard gypsum plaster and water and/or the slurry of the soft gypsum plaster and water. With this, the gypsum layer of the article becomes antibacterial. In other words, it becomes possible to suppress the growth of bacteria and fungi thereon. There are silver-containing antibacterials which are widely used for general purposes, due to their high safety and high antibacterial activity. These silver-containing antibacterials, however, are not suitable in the invention, due to that silver has a relatively high price and that a gypsum layer containing a silver-containing antibacterial tends to have discoloration by light or heat. An example of the silver-free inorganic antibacterial, which is usable in the invention, is a commercial product called SEABIO (trade name) made by a Japanese company, KABUSHIKI KAISHA KAISUI KAGAKU KENKYUSHO. This commercial product has several different types respectively having chemical compositions of $Ca_{0.95}Zn_{0.05}(OH)_2$, $Mg_{0.9}Zn_{0.1}O$, $Ca_{0.95}CU_{0.05}(OH)_2$, $Al_2Mg_3ZnO_7$, and $Al_2Mg_5ZnO_9$. As shown by these chemical compositions, each type of SEABIO is a solid solution which is an oxide or hydroxide, with an antibacterial additive of zinc or copper ion. A zinc-containing type of SEABIO is in the form of white powder, and thus does not adversely change the color of the gypsum layer. In contrast, the gypsum layer containing another type of SEABIO containing copper has a color of blue or brown. Thus, the amount of this type of SEABIO is varied, depending on the use of the final aimed product. Some types of SEABIO, which are in the form of hydroxide, are stable, even when heated up to 300° C., and the other types of SEABIO, which are in the form of oxide, do not loose their antibacterial activity, even after heated up to 1,200° C. It is noted that SEABIO is extremely resistant to alkali substances. Furthermore, SEABIO is not dissolved in water and organic solvents, and thus SEABIO contained in the gypsum layer will not be eluted therefrom. Still furthermore, SEABIO does not chemically change by the ultraviolet irradiation nor by the contact with halogen compound, and thus does not cause the environmental pollution.

In the invention, it is optional to add an aqueous solution containing about 0.5% of a setting retarder into each slurry, in order to retard the hardening of the slurry. In addition to the setting retarder, it is optional to add a polymer or antifoaming agent thereinto, as stated above.

In the invention, it is optional to prefabricate in a factory the aimed gypsum-based composite article in parts by one of the above-mentioned methods. Then, all the parts of the article are transported to the actual construction site (e.g., building) where it is settled. Then, these parts are joined together and settled there in the form of the complete article. With this optional way, the aimed article can much more easily be produced with much lower cost, and furthermore it becomes possible to make the aimed article have a much more aesthetic three-dimensional curves, as compared with another way in which a one-piece body of the gypsum-based composite article is prepared from the beginning in the actual construction site.

The entire disclosure of each of Japanese Patent Application Nos. 8-299159 filed on Nov. 12, 1996, 9-126125 filed on May 16, 1997, and 9-211476 filed on Aug. 6, 1997, including specification, claims, summary and drawings, is incorporated herein by reference in its entirety.

What is claimed is:

1. A method for producing a gypsum-based composite article reinforced with glass fibers, wherein said article comprises:

a first member made of hard gypsum;

a second member made of soft gypsum having a compressive strength which is lower than that of said hard gypsum, said second member being formed on and bonded to said first member; and said second member; and a mat made of said glass fibers, said mat being embedded in said article in a manner that said first member and said second member are bonded together by means of said mat, said method comprising the sequential steps of:

(a) preparing a substrate having a first shape;

(b) applying a mold releasing agent to an outer surface of said substrate, thereby to form a mold releasing film on said outer surface of said substrate;

(c) applying a first slurry which is a mixture of water and hard gypsum plaster, to said mold releasing film, said hard gypsum plaster being hardenable into a hard gypsum, thereby to form a first layer on said mold releasing film;

(d) disposing on said first layer a mat which is made of a the glass fibers and impregnated with a second mass of said first slurry;

(e) deaerating said mat disposed on said first layer;

(f) applying a second slurry, which is a mixture of water and a soft gypsum plaster, to said mat, said soft gypsum plaster being hardenable into a soft gypsum having a compressive strength lower than that of said hard gypsum, such that a second lower layer is formed on said mat and thus that a precursor of said gypsum-based article is formed on said substrate, said precursor being a laminate of said first layer, said mat and said second layer;

(g) curing said precursor to produce said gypsum-based article having a second shape conforming to said first shape of said substrate; and (h) removing said substrate from said gypsum-based article.

2. A method according to claim 1, wherein said hard gypsum has a compressive strength of from 240 to 700 kgf/cm$^2$, and said soft gypsum has a compressive strength of from 90 to 170 kgf/cm$^2$.

3. A method according to claim 1, wherein an aqueous solution containing about 0.5% of a setting retarder is contained in each of said first mass of the step (c), said second mass of the step (d) and said second slurry of the step (f).

4. A method according to claim 1; wherein said gypsum-based article is prefabricated in parts in a first place, then parts of said gypsum-based article are transported to a second place where said gypsum-based article is settled, and then said parts are joined together in said second place.

* * * * *